United States Patent [19]

Bardo et al.

[11] Patent Number: 4,543,218

[45] Date of Patent: Sep. 24, 1985

[54] COOLING TOWER WITH CONCRETE SUPPORT STRUCTURE, FIBERGLASS PANELS, AND A FAN SUPPORTED BY THE LIQUID DISTRIBUTION SYSTEM

[75] Inventors: Charles J. Bardo, Fort Worth; Jesse Q. Seawell, Aledo; Anthony J. Dylewski, Arlington; John L. Clark, Jr., Benbrook, all of Tex.

[73] Assignee: Ceramic Cooling Tower Company, Fort Worth, Tex.

[21] Appl. No.: 631,591

[22] Filed: Jul. 17, 1984

[51] Int. Cl.$^4$ ................................................ B01F 3/04
[52] U.S. Cl. .................................... 261/24; 52/309.1; 52/630; 261/111; 261/DIG. 11
[58] Field of Search .................. 261/24, 111, 97, 110, 261/DIG. 11, DIG. 77; 165/DIG. 1, 60; 52/275, 276, 279, 302, 303, 604, 309.1, 309.2, 245, 630, 83

[56] References Cited

U.S. PATENT DOCUMENTS

| | | | |
|---|---|---|---|
| 2,892,509 | 6/1959 | Baker et al. | 261/DIG. 11 |
| 3,171,867 | 3/1965 | Frohwerk et al. | 261/DIG. 11 |
| 3,195,870 | 7/1965 | Gruber et al. | 261/DIG. 11 |
| 3,226,894 | 1/1966 | Burchardt et al. | 261/DIG. 11 |
| 3,596,884 | 8/1971 | Murphy | 261/111 X |
| 3,637,193 | 1/1972 | Kugler et al. | 52/83 X |
| 3,648,990 | 3/1972 | Stoker et al. | 52/245 X |
| 3,779,523 | 12/1973 | Furlong et al. | 261/DIG. 11 |
| 3,834,681 | 9/1974 | Fordyce et al. | 261/DIG. 11 |
| 4,029,144 | 6/1977 | Harris | 261/DIG. 11 |
| 4,060,575 | 11/1977 | Uhlirsch et al. | 52/630 X |
| 4,094,937 | 6/1978 | Bodick et al. | 261/DIG. 11 |
| 4,120,162 | 10/1978 | Heeren | 165/DIG. 1 |
| 4,382,046 | 5/1983 | Frohwerk | 261/DIG. 11 |
| 4,416,836 | 11/1983 | Sinek | 261/DIG. 11 |
| 4,422,983 | 12/1983 | Bardo et al. | 261/DIG. 11 |

FOREIGN PATENT DOCUMENTS

829555 3/1960 United Kingdom ....... 261/DIG. 11

*Primary Examiner*—Richard L. Chiesa

[57] ABSTRACT

A liquid cooling tower includes precast concrete support legs and cross beams and fiberglass reinforced polyester resin side and top panels. A liquid distribution system is supplied with liquid by a vertically extending main pipe, and a fan and fan motor are supported by the main pipe.

9 Claims, 33 Drawing Figures

# COOLING TOWER WITH CONCRETE SUPPORT STRUCTURE, FIBERGLASS PANELS, AND A FAN SUPPORTED BY THE LIQUID DISTRIBUTION SYSTEM

BACKGROUND

This invention relates to liquid cooling towers, and, more particularly, to a cooling tower which includes precast concrete support legs, fiberglass reinforced polyester resin side panels and top panel, and a fan which is supported by the liquid distribution system.

Cooling towers are used to cool liquid by contact with air. The liquid is allowed to flow downwardly through the tower, and a counter current flow of air is drawn through the falling liquid by various means. A common application of liquid cooling towers is for cooling water (dissipating waste heat) used in electrical generating and process plants and industrial and institutional air conditioning systems.

Most cooling towers include a tower structure which encloses a fill material. The fill material has spaces through which the liquid flows downwardly and the air flows upwardly to provide heat and mass transfer between the liquid and the air. The tower structure may be formed from concrete, metal, or other material.

Metal parts of cooling towers can be corroded by the local atmosphere and/or the liquid which is being cooled. Concrete is very durable, but concrete towers are expensive and heavy. Many cooling towers are located on roofs of buildings, and the weight of a concrete cooling tower can cause building design problems. Co-owned U.S. Pat. No. 4,382,046 refers to a cooling tower with concrete walls which are supported above a concrete water basin by concrete supports.

Plastic parts are resistant to corrosion, but plastic parts ordinarily would not provide enough strength to support the fill material and the weight of the tower itself. One well known type of fill material which is used by Ceramic Cooling Towers of Fort Worth, Tex. consists of stacked layers of open-celled clay tiles. This fill material can weigh 60,000 to 70,000 pounds for a conventional size air conditioning cooling tower. Plastic structural parts of a cooling tower must not only support the weight of the fill material but must also resist wind forces and should be designed to withstand earthquake loads.

Co-owned U.S. Pat. No. 4,422,983 describes a cooling tower formed from fiberglass reinforced polyester resin panels and beams. All of the structural parts of the tower are fiberglass reinforced polyester resin except the cast iron lintels which are used to support the fill material and stainless steel bolts which connect the fiberglass reinforced polyester resin parts.

SUMMARY

This invention provides a cooling tower in which the weight of the tower and the fill material are supported by precast concrete support legs. The top panel and part of the weight of the fan motor is supported by vertically extending fiberglass reinforced polyester resin columns which extend upwardly from the concrete support legs. The sides of the tower are enclosed by fiberglass reinforced polyester resin side panels which are required to support only their own weight, wind load, and seismic loads. A liquid supply pipe extends vertically upwardly through the fill material and terminates in a liquid distribution box. The fan is supported by the liquid distribution box and the pipe.

DESCRIPTION OF THE DRAWING

The invention will be explained in conjunction with illustrative embodiments shown in the accompanying drawing, in which.

DESCRIPTION OF SPECIFIC EMBODIMENTS

Referring first to FIGS. 1-4, the numeral 40 designates generally a mechanical draft type of cooling tower which is used for cooling water for an air conditioning system. The cooling tower is located within a poured concrete water basin 41 having a floor 42 and side walls 43.

The cooling tower is supported by precast reinforced concrete support legs 44 which are connected together by precast reinforced concrete cross beams 45. A pair of top panel halves 46 and 47 are supported by vertically extending columns 48 which are attached to the concrete legs, and four side panels 49, 50, 51, and 52 extend between the concrete legs and the top panel outside of the columns. The top panel provides a fan opening 53 (FIG. 2), and a pair of semi-cylindrical fan shroud halves 54 and 55 are attached to the top panel around the fan opening. The vertical support columns 48, side panels 49-52, top panels 46 and 47, and fan shrouds 54 and 55 are all made of fiberglass reinforced polyester resin as described in U.S. Pat. No. 4,422,983.

A plurality of cast iron support lintels 57 are supported by adjacent pairs of concrete legs, and the lintels support the fill material 58 of the tower. A water supply pipe 59 extends vertically upwardly from an elbow 60 through the center of the fill material. The elbow 60 is bolted to the concrete water basin by support bracket 61 and is connected to the hot water outlet of the air conditioning system by conventional piping (not shown).

A liquid distribution assembly 62 is connected to the upper end of the water pipe 59 and includes a water distribution box 63 and a pair of headers 64 and 65 (FIGS. 1 and 3) which are connected to the water distribution box and extend horizontally above the fill material. Lateral pipes 66 extend perpendicularly from both sides of the headers, and each lateral is equipped with a plurality of spray nozzles 67 for spraying water onto the top of the fill material.

A fan assembly 68 is supported by the water distribution box 63. The fan draws air from outside of the cooling tower through the bottom of the fill material. A conventional drift eliminator 69 is supported on top of the laterals 66.

Each of the concrete legs 44 is generally U-shaped and includes a horizontal beam portion 71 and a pair of foot portions 72 which extend downwardly from the beam portion. The sides of the beam portion are recessed to provide horizontal supporting ledges 73 (see also FIG. 24) for supporting the ends of the cast iron lintels 57. The ends of the beam portion are provided with rectangular recesses 74 (FIG. 24) into which the ends of the cross beams 45 are inserted. The bottom of the cross beam is supported by the horizontal ledge 75.

Figure 25:
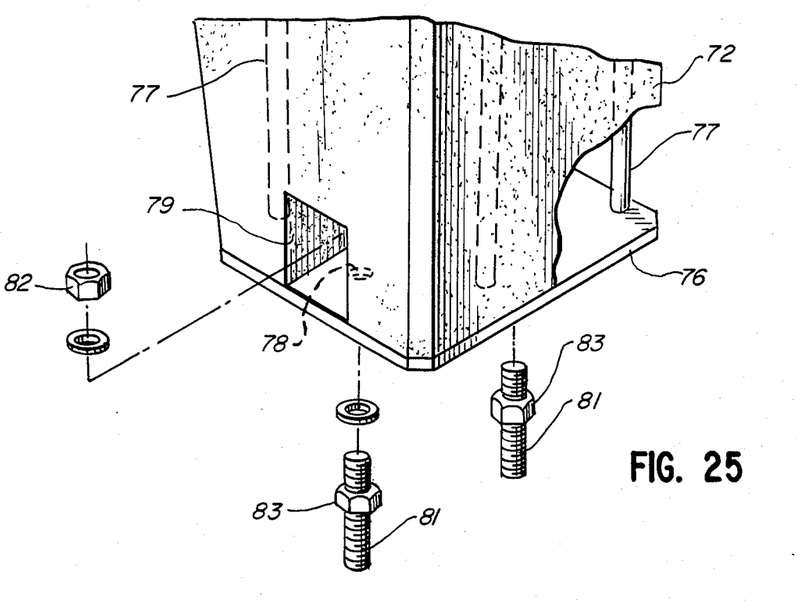
FIG. 25 is an enlarged fragmentary perspective view of the foot portion of one of the concrete support legs.

Referring to FIG. 25, a metal foot plate 76 covers the bottom of each concrete foot portion 72 and is secured to the foot portion by metal anchor rods 77 which are welded to the plate and are embedded in the concrete. The foot plate is provided with a pair of bolt holes 78, and the concrete foot portion is provided with a pair of recesses 79 above the bolt holes.

Figure 3:
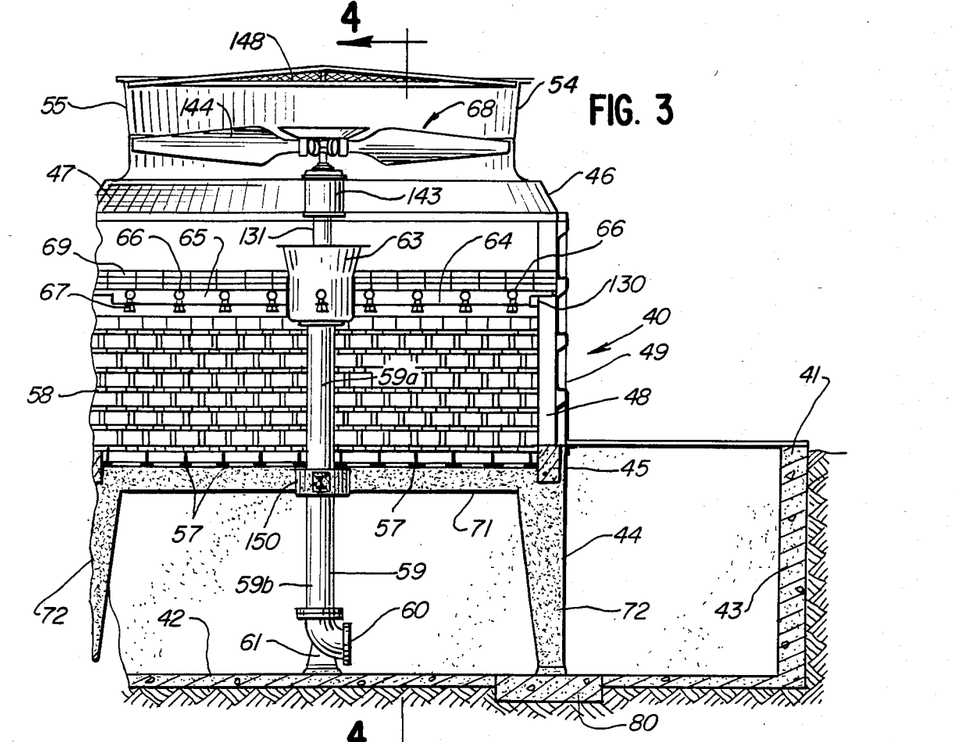
FIG. 3 is a fragmentary sectional view taken along the line 3—3 of FIG. 1.

Referring to FIG. 3, the concrete legs are supported by concrete footings 80 within the basin 41, and the concrete legs are attached to the footings by bolts 81 (FIG. 25) which are screwed into suitable internally threaded fittings or anchors in the footings. The upper ends of the bolts extend through the foot plate and are secured by nuts 82 which can be tightened by virtue of the recesses 79. The bolts 81 in FIG. 25 are leveling bolts and include a center nut 83. The bolts are adjusted in the anchors to level the concrete legs and the tower, and the nuts 82 are then screwed onto the bolts to secure the legs to the bolts. The spaces between the metal foot plates and the floor of the water basin, the outside surfaces of the metal foot plates, and the bolt recesses 79 are filled with grout so that no metal is exposed.

Figure 24:
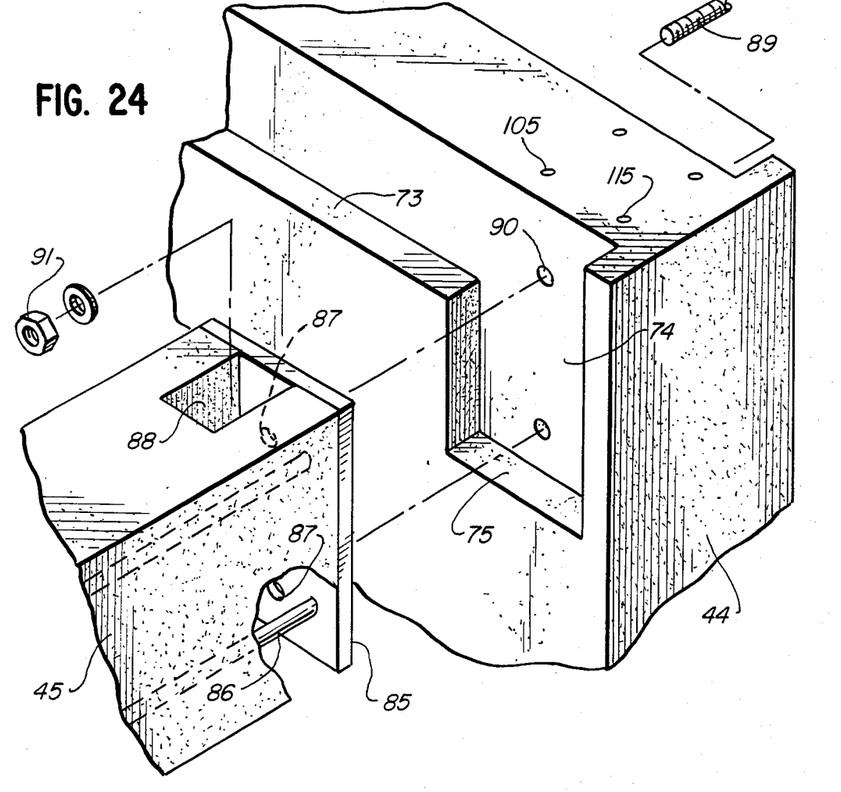
FIG. 24 is an enlarged fragmentary perspective view of one of the concrete support legs and concrete cross beams.

Referring to FIG. 24, a metal end plate 85 is secured to each end of each cross beam 45 by anchor rods 86 which are welded to the plate and embedded in the concrete. The end plate is provided with a pair of bolt holes 87, and the end of the beam is provided with a pair of recesses 88 adjacent the bolt holes. Each end of each cross beam is inserted into the rectangular recess 74 of one of the concrete legs and is supported by the ledge 75. The beams are secured to the legs by bolts 89 which extend through bolt holes 90 in the leg and by nuts 91. The recesses 88 are filled with grout and the top surface of the plate 85 is covered with grout so that no metal is exposed.

FIG. 3 illustrates the concrete supporting structure for a single-cell cooling tower. Four concrete legs 44 are connected together by six concrete cross beams 45. The resulting structure provides a self-supporting, strong, box-like support for the cooling tower and the fill material.

Figures 26, 27, 28, 29, 30:
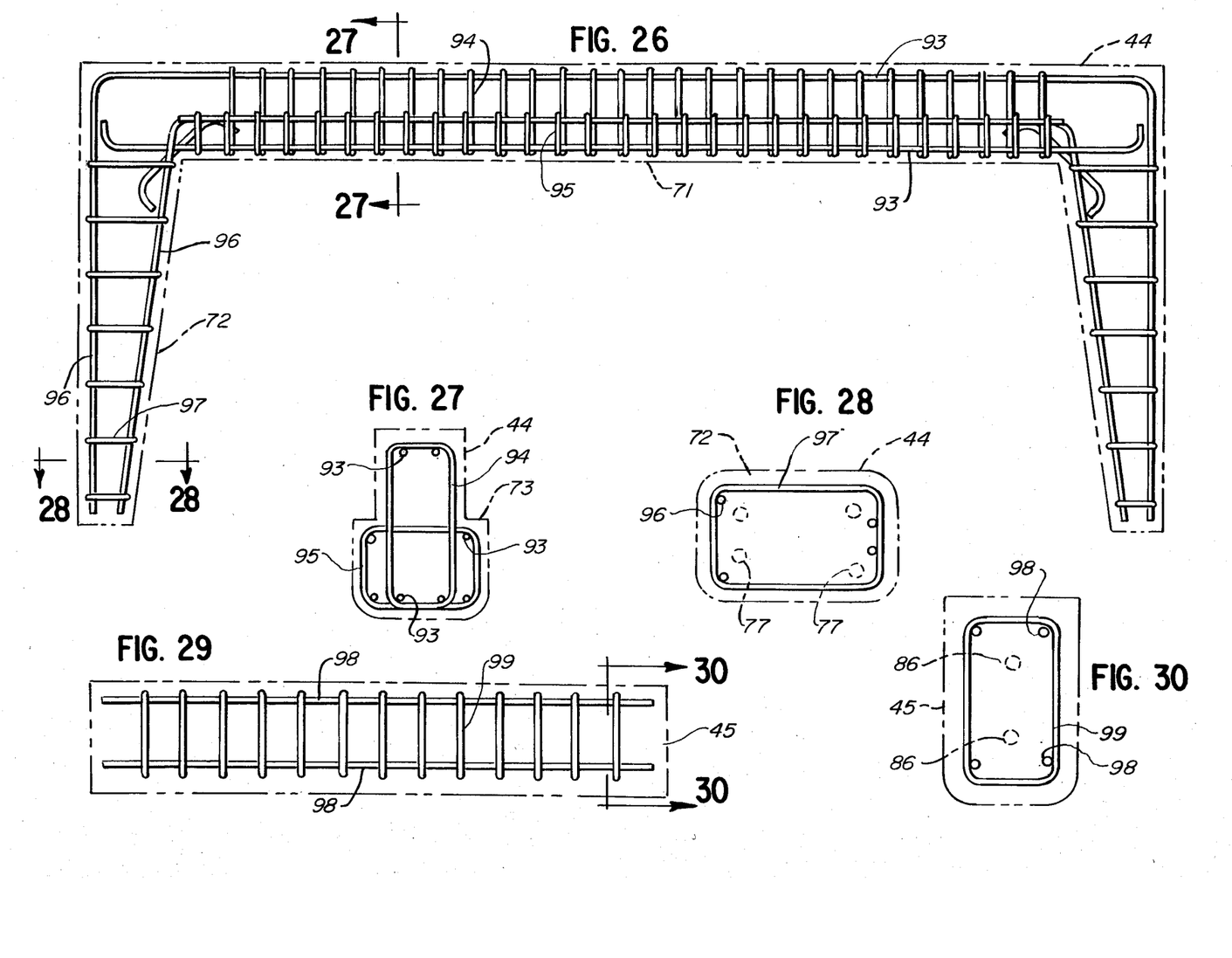
FIG. 26 is an elevational view of the metal reinforcing frame for one of the concrete support legs.
FIG. 27 is a sectional view taken along the line 27—27 of FIG. 26.
FIG. 28 is an enlarged sectional view taken along the line 28—28 of FIG. 26.
FIG. 29 is an elevational view of the metal reinforcing frame for one of the concrete cross beams.
FIG. 30 is an enlarged sectional view taken along the line 30—30 of FIG. 29.

FIGS. 26-28 illustrate the metal reinforcing frame for one of the concrete legs 44, which is indicated by the dotted outline. The beam portion 71 of the leg is reinforced by eight longitudinally extending metal rods 93 (see particularly FIG. 27), a plurality of longitudinally spaced rectangularly formed rods 94, and a plurality of longitudinally spaced rectangularly formed rods 95 which reinforce the supporting ledges 73. The foot portions 72 of the leg are reinforced by four longitudinally extending rods 96 and longitudinally spaced rectangularly formed rods 97. Referring to FIG. 28, the anchor rods 77 of the metal foot plates 76 are positioned to extend upwardly inside of the rectangular rods 97 before the concrete is poured.

Referring to FIGS. 29 and 30, the concrete cross beams 45 are reinforced by four longitudinally extending metal rods 98 and longitudinally spaced rectangularly formed metal rods 99. Referring to FIG. 30, the anchor rods 86 of the metal end plates 85 are positioned inside of the rectangular rods 99 before the concrete is poured.

The support lintels 57 (FIGS. 3 and 4) for the fill material are advantageously formed from cast iron and have an inverted T-shaped transverse cross section as described in U.S. Pat. Nos. 4,382,046 and 4,422,983. The fill material 58 is advantageously provided by the rectangular open-celled extruded clay tiles which are also described in U.S. Pat. Nos. 4,382,046 and 4,422,983. The tiles are supported by the lintels and are stacked in a plurality of layers to provide the heat and mass transfer exchange means for the tower. The water supply pipe 59 extends through the center of the fill material, and the tiles are simply arranged around the pipe. The tiles can be broken into smaller portions if desired to fill in spaces around the pipe.

Figure 2:
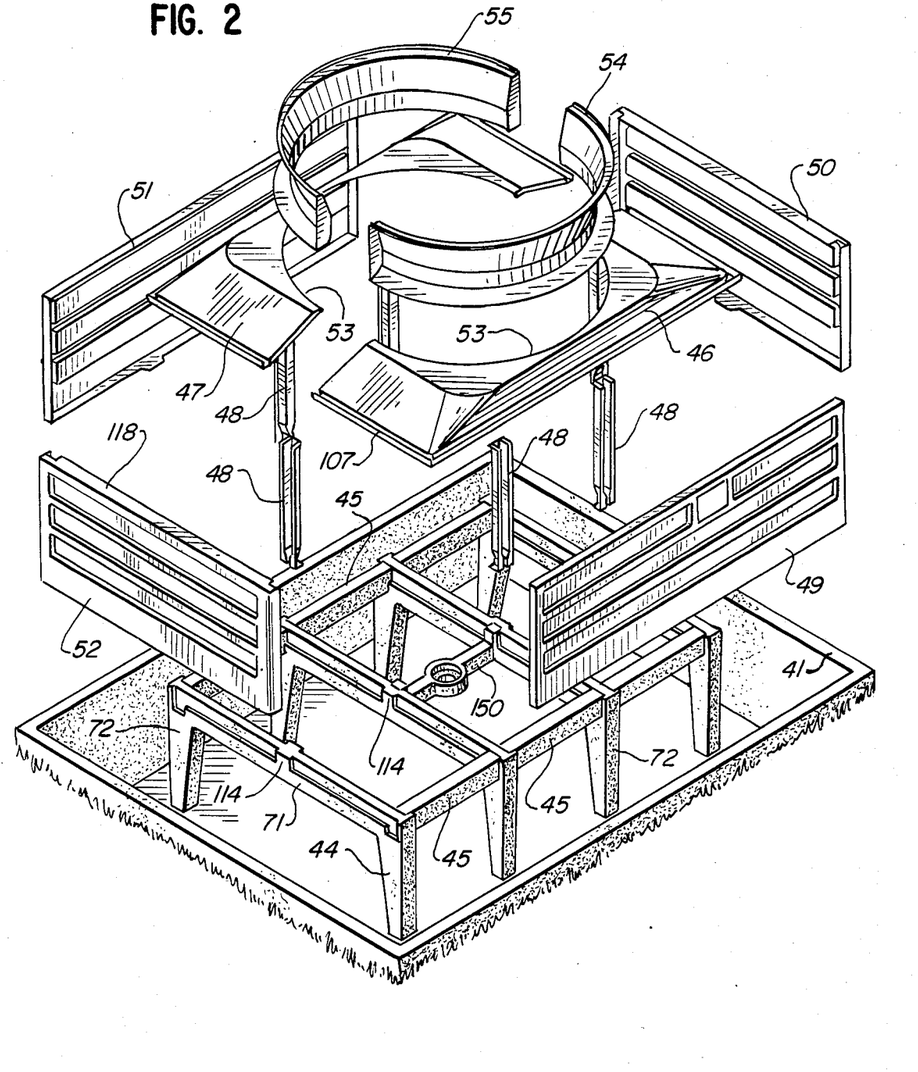
FIG. 2 is an exploded perspective view showing the concrete support structure and the exterior components of the tower.
Figures 8, 9, 10, 11:
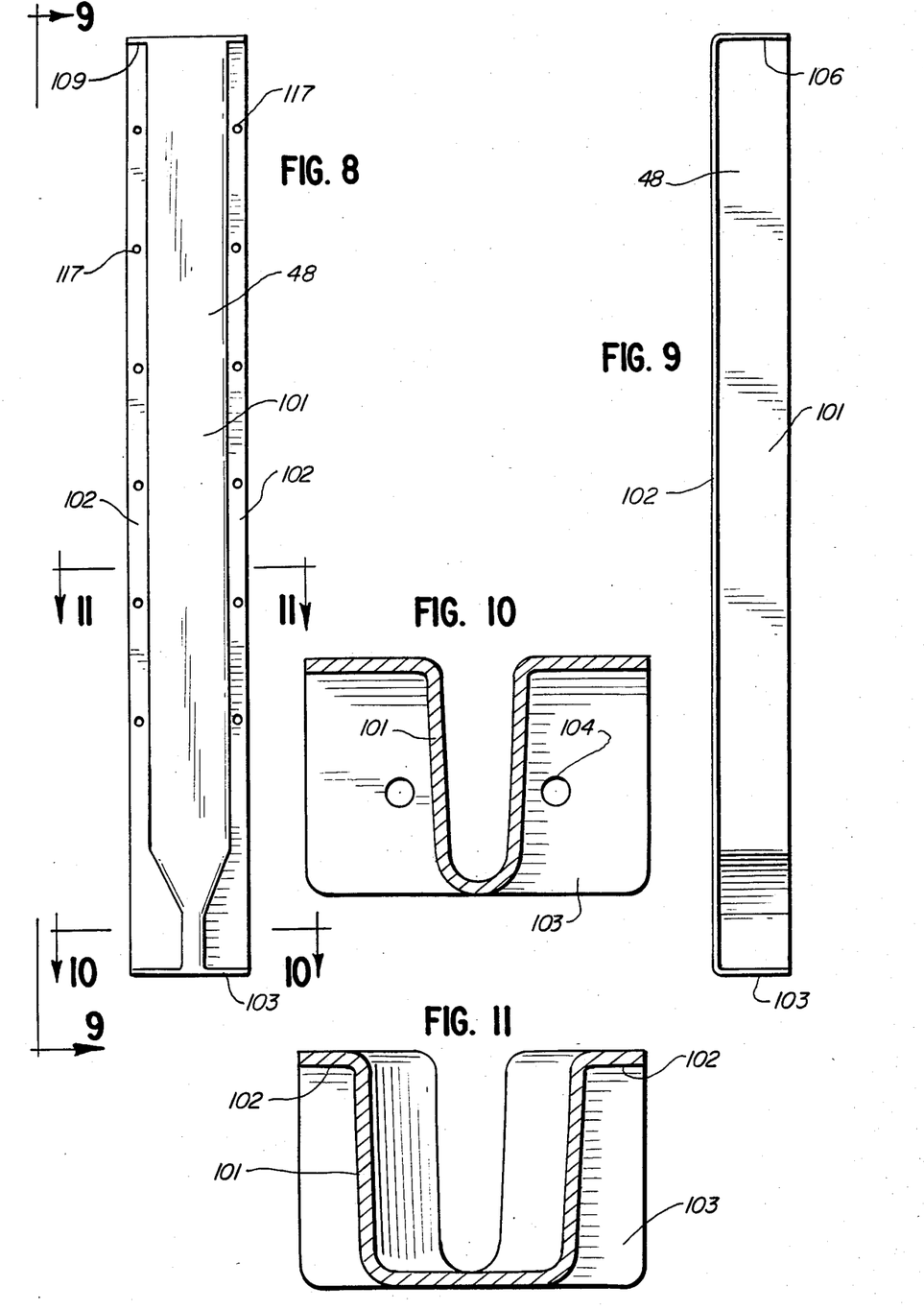
FIG. 8 is a front elevational view of one of the vertical support columns.
FIG. 9 is a side elevational view taken along the line 9—9 of FIG. 8.
FIG. 10 is an enlarged sectional view taken along the line 10—10 of FIG. 8.
FIG. 11 is an enlarged sectional view taken along the line 11—11 of FIG. 8.

FIGS. 8-11 illustrate the vertically extending fiberglass reinforced polyester resin support columns 48 which extend upwardly from the concrete legs as shown in FIG. 2. Each column includes a channel-shaped central portion 101 which merges with a pair of side flanges 102. The channel portion 101 narrows at the bottom of the column as shown in FIG. 10. A bottom flange 103 is provided with bolt holes 104 for bolting the column to the top of one of the concrete legs. Referring to FIG. 24, each concrete leg is provided with holes 105 into which internally threaded inserts are fitted for bolting the vertical columns.

Referring again to FIGS. 8 and 9, the upper end of the vertical column 48 includes a pair of top flanges 106 which are provided with bolt holes. The outer edge of the top panel halves 46 and 47 terminate in a rain trough 107 (FIGS. 1-3) which is supported by the upper ends of the vertical columns and is bolted to the top flanges 106.

Figure 12:
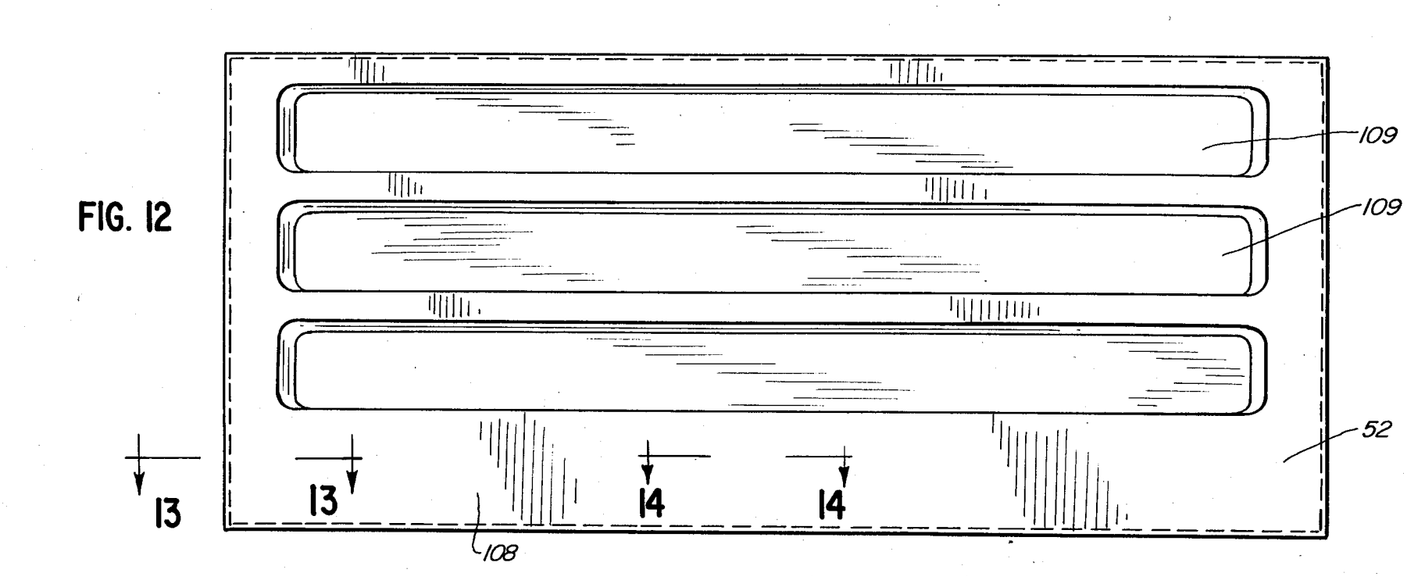
FIG. 12 is a front elevational view of one of the side panels.
Figure 13:
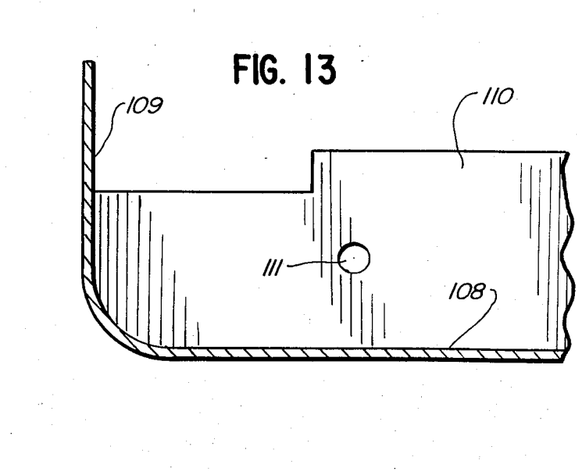
FIG. 13 is an enlarged fragmentary sectional view taken along the line 13—13 of FIG. 12.
Figure 14:
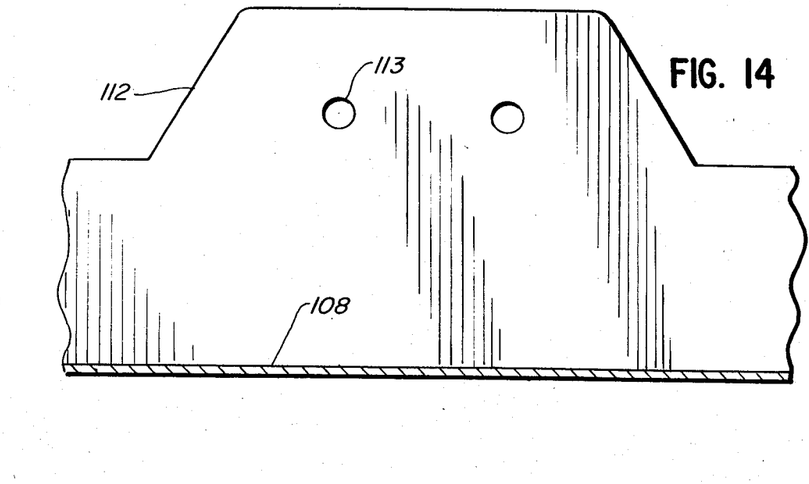
FIG. 14 is an enlarged fragmentary sectional view taken along the line 14—14 of FIG. 12.

Referring to FIGS. 12-14, each of the fiberglass reinforced polyester resin side panels 49-52 includes an outer wall 108 in which is formed a plurality of inwardly extending recesses 109 for strengthening the outer wall. The sides of each panel terminate in side flanges 109 which can be bolted to the side flanges of the adjacent side panels. The bottom of the panel terminates in an inwardly extending bottom flange 110. Each end of the bottom flange is provided with a bolt hole 111 for bolting the flange to one of the concrete support legs. The bottom flange of each of the side panels 50 and 52 which extend parallel to one of the concrete legs is provided with an extension 112 and a pair of bolt holes 113. The extension 112 is bolted to the non-recessed central portion 114 (FIG. 2) of the concrete leg at the end of the concrete support structure. The bottom flanges of the other side panels 49 and 51 are provided with similar projections 112 for bolting to the ends of the intermediate concrete legs. Referring to FIG. 24, each concrete leg is provided with holes 115 into which internally threaded inserts are fitted for bolting the bottom flanges of the side panels.

Referring to FIG. 2, a vertically extending column 48 is bolted to each end of each concrete leg 44 and to the central portion 114 of the two end concrete legs. The side flanges 102 (FIG. 8) of the columns are provided with bolt holes 117 for bolting the side panels to the columns. Each side panel also includes a top flange 118 (FIG. 2) which is bolted to the trough 107 of the top panels 46 and 47 and to the top flanges of the vertical columns 48.

Figure 1:
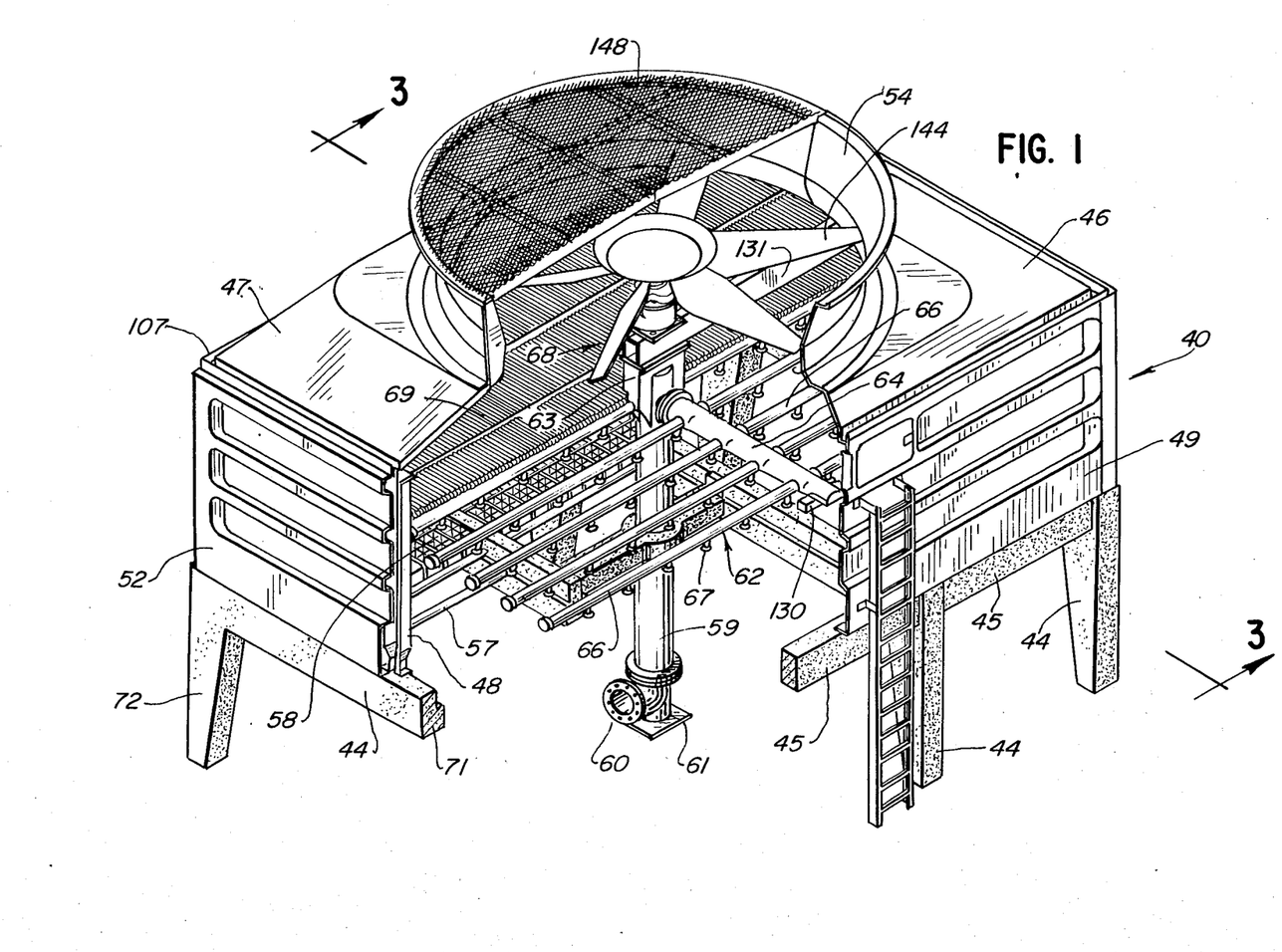
FIG. 1 is a perspective view, partially broken away, of a cooling tower formed in accordance with the invention.
Figure 4:
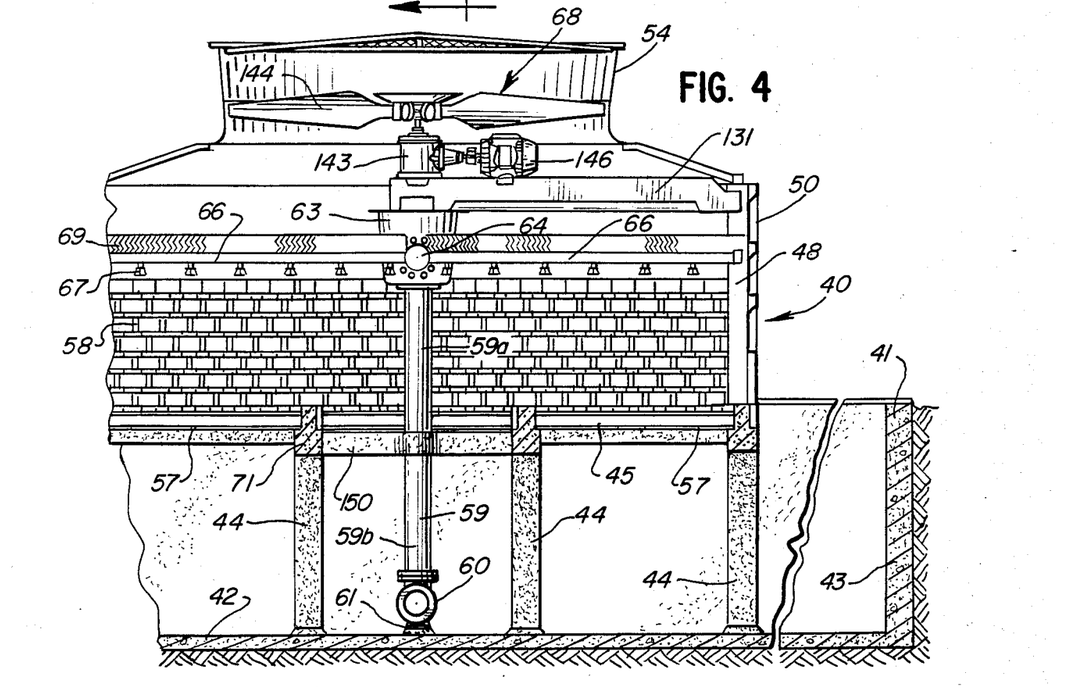
FIG. 4 is a fragmentary sectional view taken along the line 4—4 of FIG. 3.
Figures 18, 19, 20:
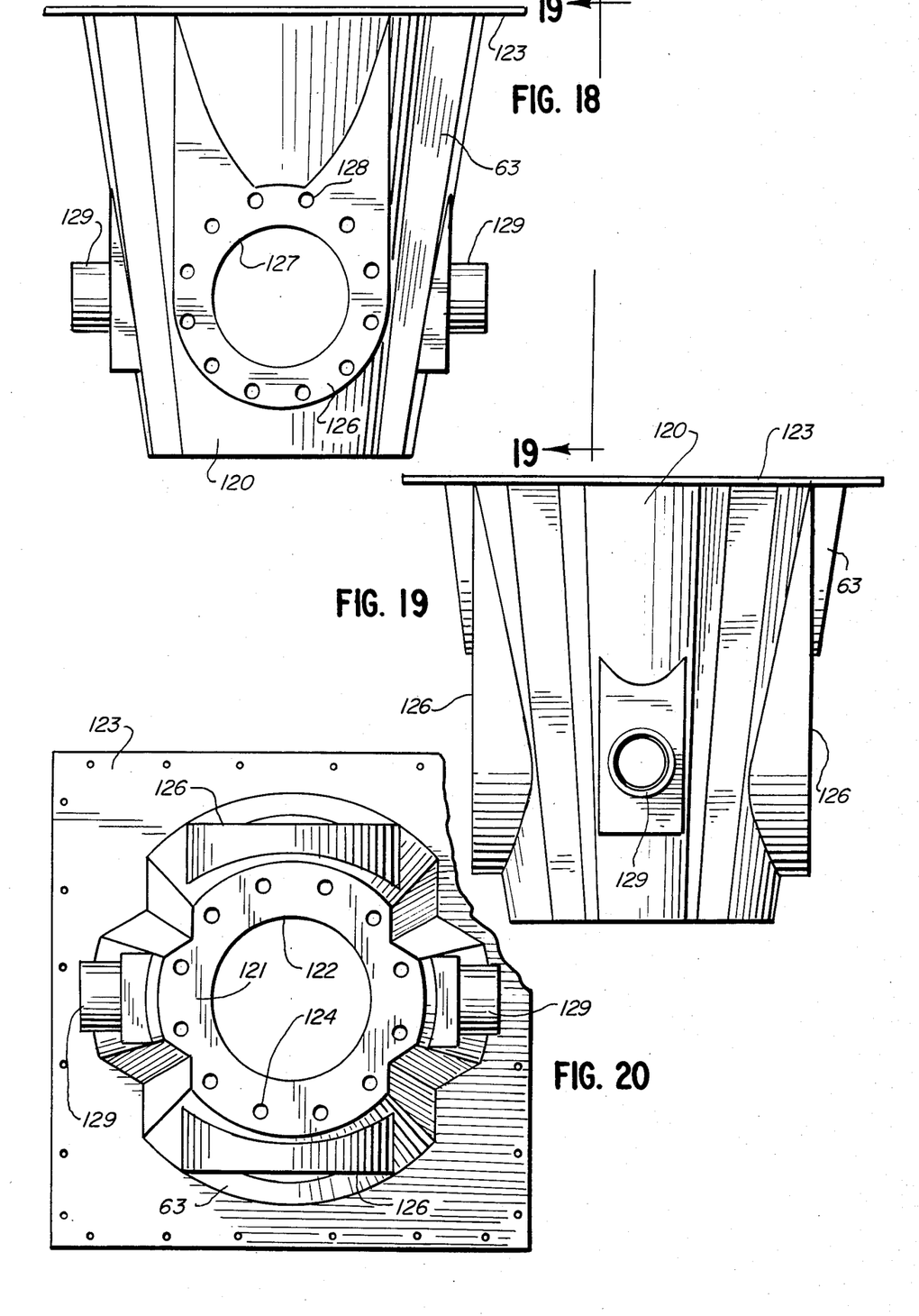
FIG. 18 is an enlarged elevational view of the liquid distribution box.
FIG. 19 is an elevational view of the liquid distribution box taken along the line 19—19 of FIG. 18.
FIG. 20 is a bottom plan view of the liquid distribution box of FIG. 18.

FIGS. 18-20 illustrate the water distribution box 63 which is bolted to the top end of the water supply pipe 59 as illustrated in FIGS. 1, 3, and 4. The distribution box is formed from fiberglass reinforced polyester resin and includes a generally frusto-conical side wall 120, a bottom wall 121 which is provided with a central opening 122, and a rectangular top plate 123. The bottom wall 121 is provided with bolt holes 124 for bolting the distribution box to the top flange of the water pipe 59.

Referring to FIGS. 18 and 19, the side wall 120 is provided with a flat attaching surface 126 with a central opening 127. Bolt holes 128 are provided around the opening 127 for attaching the flanges of the headers 64 and 65 (FIG. 3) to the distribution box. A pair of cylindrical couplings 129 extend outwardly from the distribution box at right angles to the openings 127 for the headers for connecting two lateral pipes 66 to the distribution box.

The two headers 64 and 65 extend from the distribution box in opposite directions toward the side panels 49 and 50. The outer end of each header is supported by a horizontal beam 130 (FIGS. 1 and 3) which extends between two adjacent columns 48 and is bolted thereto. The headers 64 and 65 and the laterals 66 are formed from fiberglass reinforced polyester resin. The nozzles 67 are advantageously formed from ABS plastic. The pipe 59 can be formed from fiberglass reinforced polyester resin, steel, cast iron, or ductile iron.

Figures 15, 16:
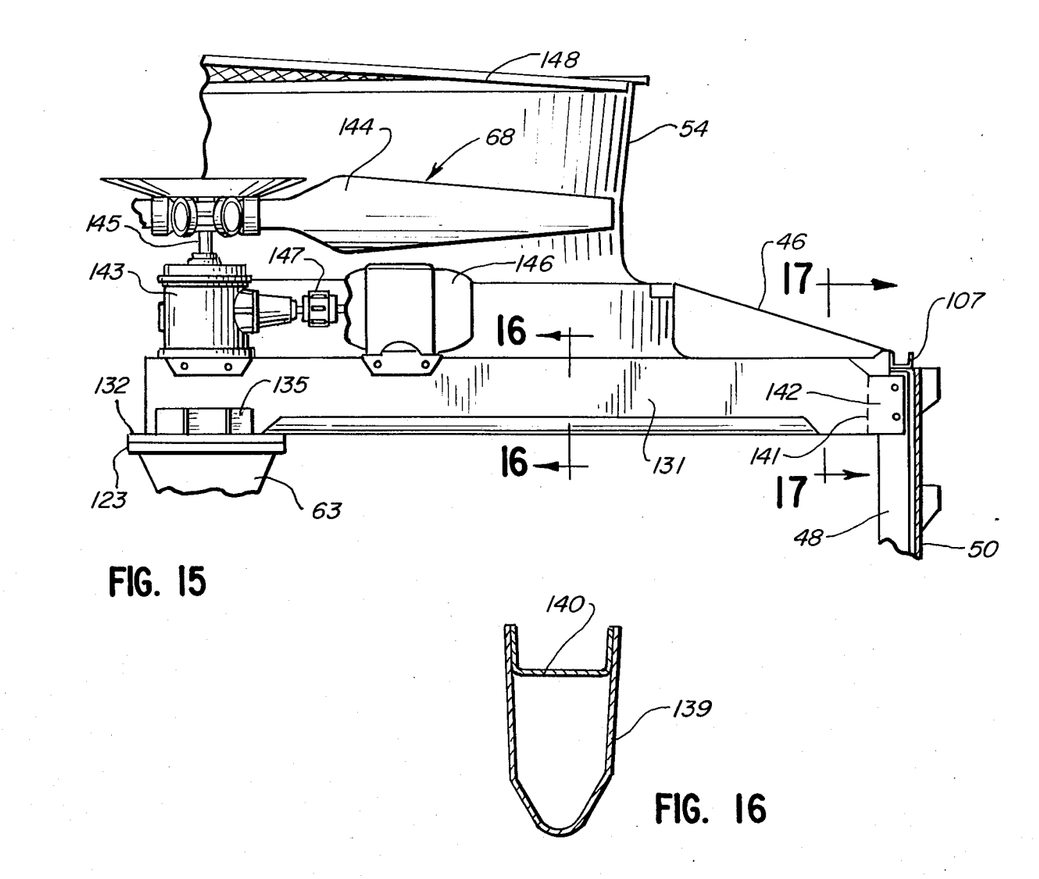
FIG. 15 is an enlarged fragmentary view of the upper portion of FIG. 4.
FIG. 16 is a sectional view of the support beam of FIG. 15 taken along the line 16—16.

Referring to FIG. 15, a fan support beam 131 extends between the liquid distribution box 63 and one of the vertical columns 48 (see also FIG. 4). The right end of the fan support beam 131 in FIG. 15 is bolted to the vertical column 48, and the left end of the beam is supported by a metal beam mounting plate 132 which is bolted to the top plate 123 of the distribution box 63.

Figure 21:
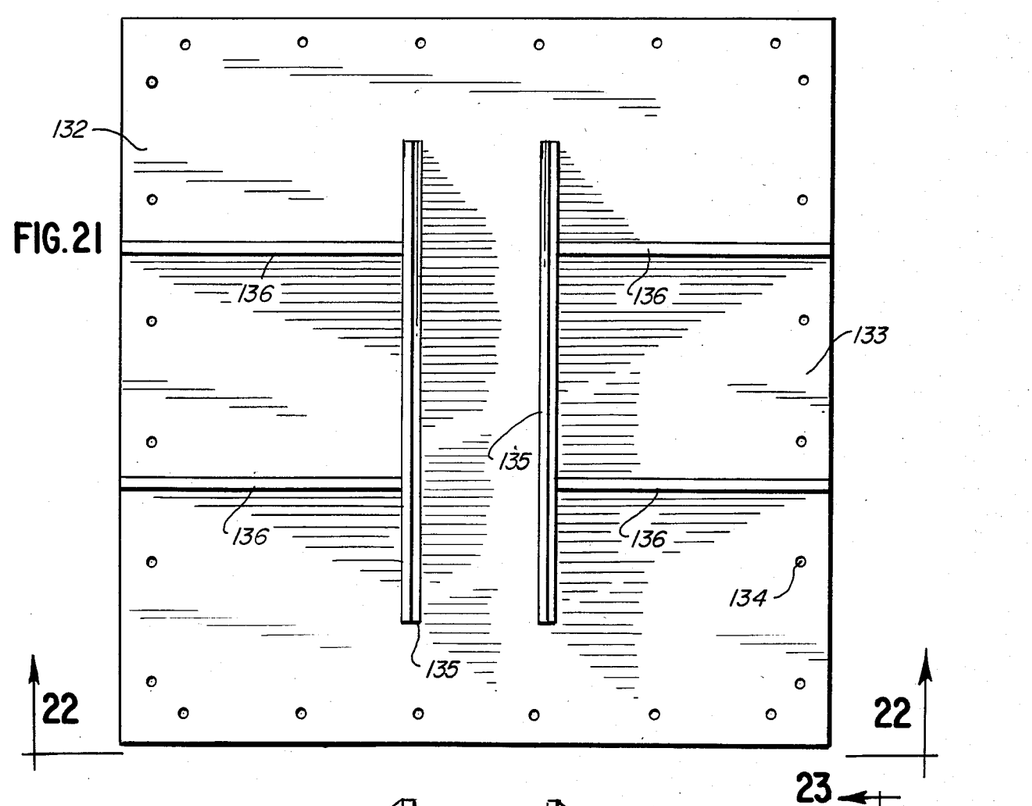
FIG. 21 is a top plan view of the support plate for the liquid distribution box.
Figure 22:
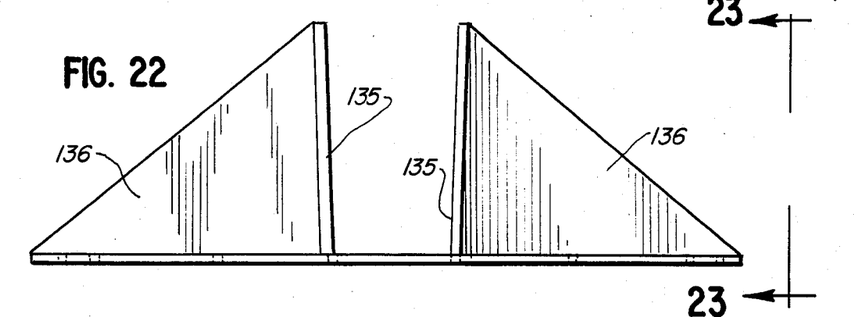
FIG. 22 is an elevational view of the support plate of FIG. 21 taken along the line 22—22.
Figure 23:
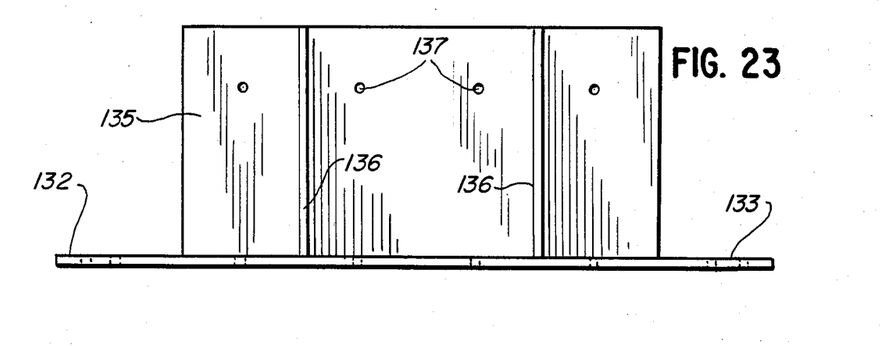
FIG. 23 is an elevational view of the support plate of FIG. 22 taken along the line 23—23.

The beam mounting plate 132 is illustrated in FIGS. 21-23 and includes a flat plate 133 which has the same dimensions as the top plate 123 of the water distribution box 63 and which is bolted to the top plate 123 through bolt holes 134. A pair of side plates 135 are welded to the bottom plate 133 and form a channel for holding the fan support beam 131. The side plates 135 are angled slightly away from each other to conform to the sides of the beam 131 and are supported by triangular gusset plates 136 which are welded to the side plates 135 and to the bottom plate 133. The side plates are provided with bolt holes 137 (FIG. 23) for bolting the side plates to the beam 131.

Figure 17:
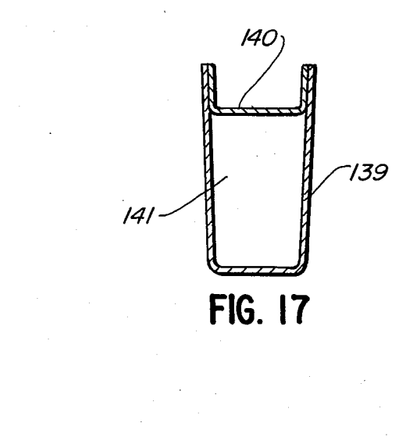
FIG. 17 is a sectional view of the end portion of the support beam of FIG. 15 taken along the line 17—17.

Referring now to FIGS. 15-17, the fan support beam 131 is formed from fiberglass reinforced polyester resin and includes a generally U-shaped outer wall 139 and a U-shaped top wall 140 which is positioned in the upper end of the outer wall 139. At the right end of the beam 131 in FIG. 15 the side portions of the outer wall 139 extend rearwardly beyond the end wall 141 to provide attaching flanges 142 which are bolted to the vertical support beam 48. The left end of the beam 131 is positioned between the side plates 135 of the beam mounting plate 132 and is secured by bolts which extend through the bolt holes 137 in the side plates.

Still referring to FIG. 15, a conventional gear reducer 143 is mounted on the fan support beam 131 directly above the water distribution box 63, and a fan 144 is driven by a vertically extending drive shaft 145 which extends upwardly from the gear reducer. The axis of the shaft 145 is aligned with the axis of the water supply pipe 59. A conventional fan motor 146 is mounted on the top of the support beam 131 and is connected to the gear reducer 143 by a jaw coupling 147. A fan screen 148 is supported by the fan shroud 54. The fan 144 is advantageously formed from fiberglass reinforced polyester resin.

Figure 5:
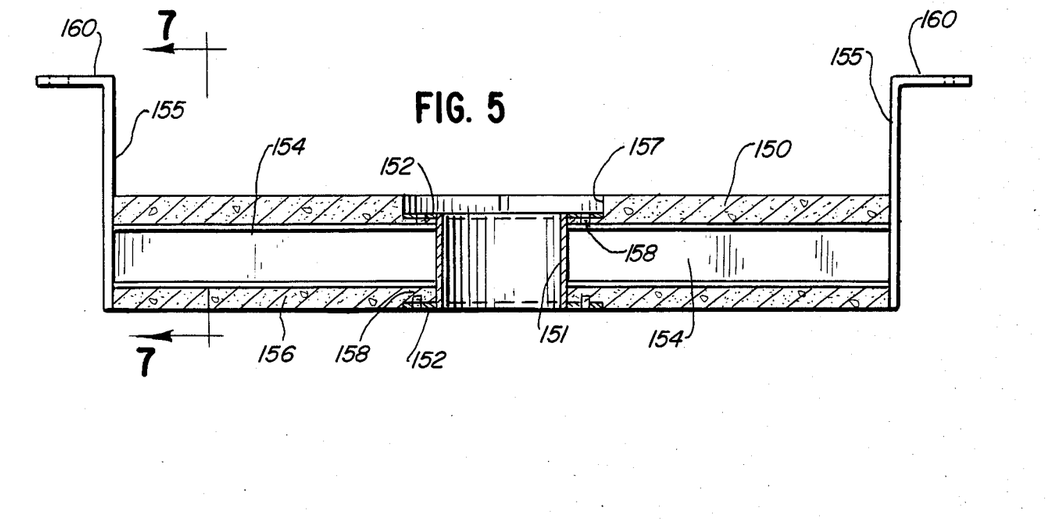
FIG. 5 is a longitudinal sectional view of the support beam for the main liquid supply pipe.
Figure 6:
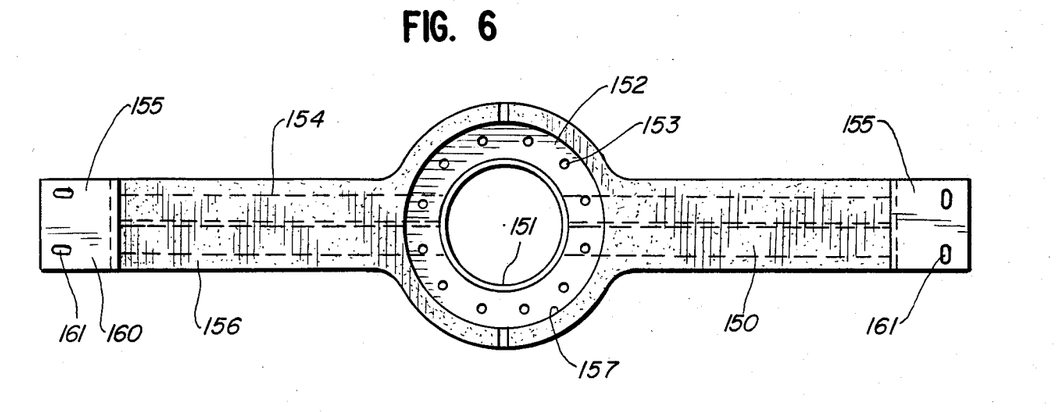
FIG. 6 is a top plan view of the support beam of FIG. 5.
Figure 7:
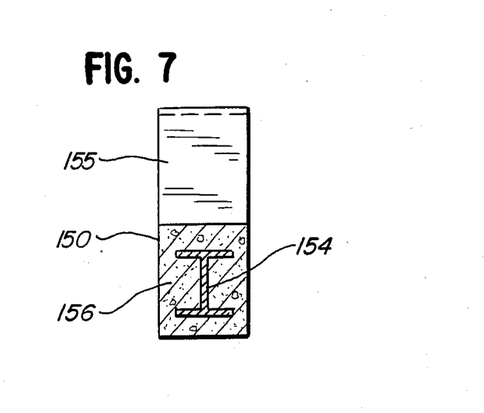
FIG. 7 is a sectional view taken along the line 7—7 of FIG. 5.

Referring to FIGS. 3 and 4, the water supply pipe 59 is formed by upper and lower pipe portions 59a and 59b which are connected to a concrete cross beam 150 which extends between two adjacent concrete legs 44 (see also FIG. 2). Referring to FIGS. 5-7, the cross beam 150 includes a cylindrical metal pipe 151 which has the same diameter as the pipe portions 59a and 59b and upper and lower annular metal attaching flanges 152 which are provided with bolt holes 153. A pair of metal I beams 154 are welded to opposite sides of the pipe 151, and an L-shaped metal attaching bracket 155 is welded to the outer end of each of the I beams 154. Concrete 156 is cast around the I beams 154 and between the upper and lower attaching flanges 152. The upper surface of the concrete extends above the top attaching flange 152 to provide a circular recess 157 in the top of the beam. Internally threaded metal inserts 158 are embedded in the concrete and are aligned with the bolt holes 153 in the top and bottom flanges 152.

The top plate 160 of the L-shaped support brackets 155 are provided with bolt holes 161 (FIG. 6), and the top plates 160 are bolted to the central portions 114 of two of the concrete legs as shown in FIG. 2. Each of the pipe portions 59a and 59b include top and bottom connecting flanges, and the bottom flange of the pipe portion 59a is inserted into the recess 157 in the cross beam 150 and secured by bolts. The top flange of the pipe portion 59b is connected to the bottom of the cross beam 150. The cross beam 150 therefore supports the upper pipe portion 59a which in turn supports the water distribution box 63 and the water distribution assembly, the gear reducer 143, and the fan 145. The weight of the fan motor 146 is supported by the fan support beam 131, and most of the weight of the fan motor is supported by the water distribution box 63 and the water pipe 59a. However, a portion of the weight of the fan motor is supported by the column 48 shown in FIG. 15 which is attached to the right end of the beam 131. When the fan is operating to draw air upwardly through the fill material, the fan imposes a downward dynamic load which is also supported by the pipe 59a and the pipe support beam 150.

The weight of the water distribution assembly, fan, gear reducer, and fan motor and the dynamic load of the fan is also supported by the bottom pipe 59b which is attached to the floor of the water basin by the bracket 61. Depending upon the weight which is supported by the pipe 59, the cross beam 150 can be omitted, and the entire load can be supported by the pipe 59 and the floor of the basin.

Figure 31:
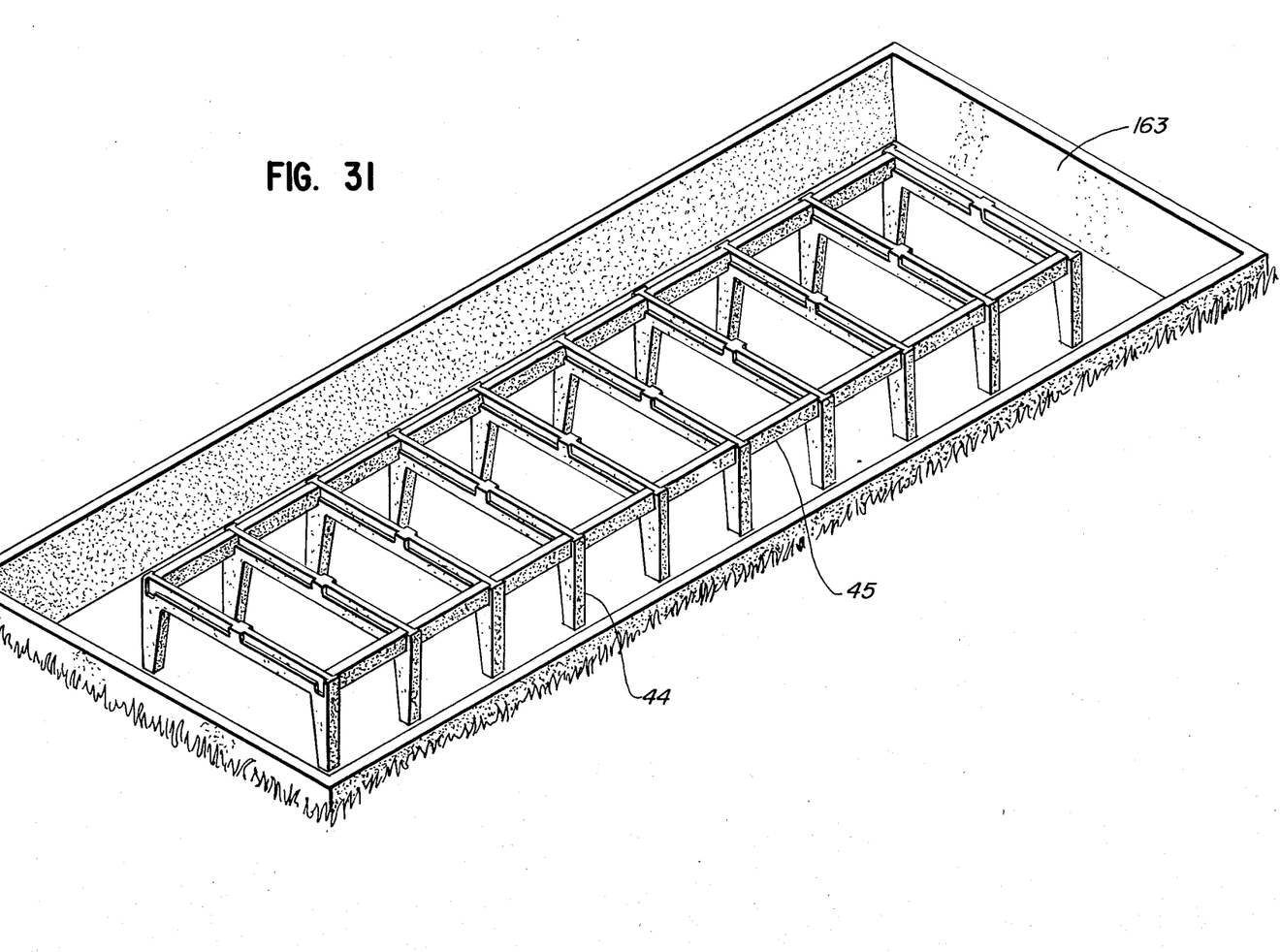
FIG. 31 is a perspective view of the concrete support structure for a three-cell cooling tower.
Figure 32:
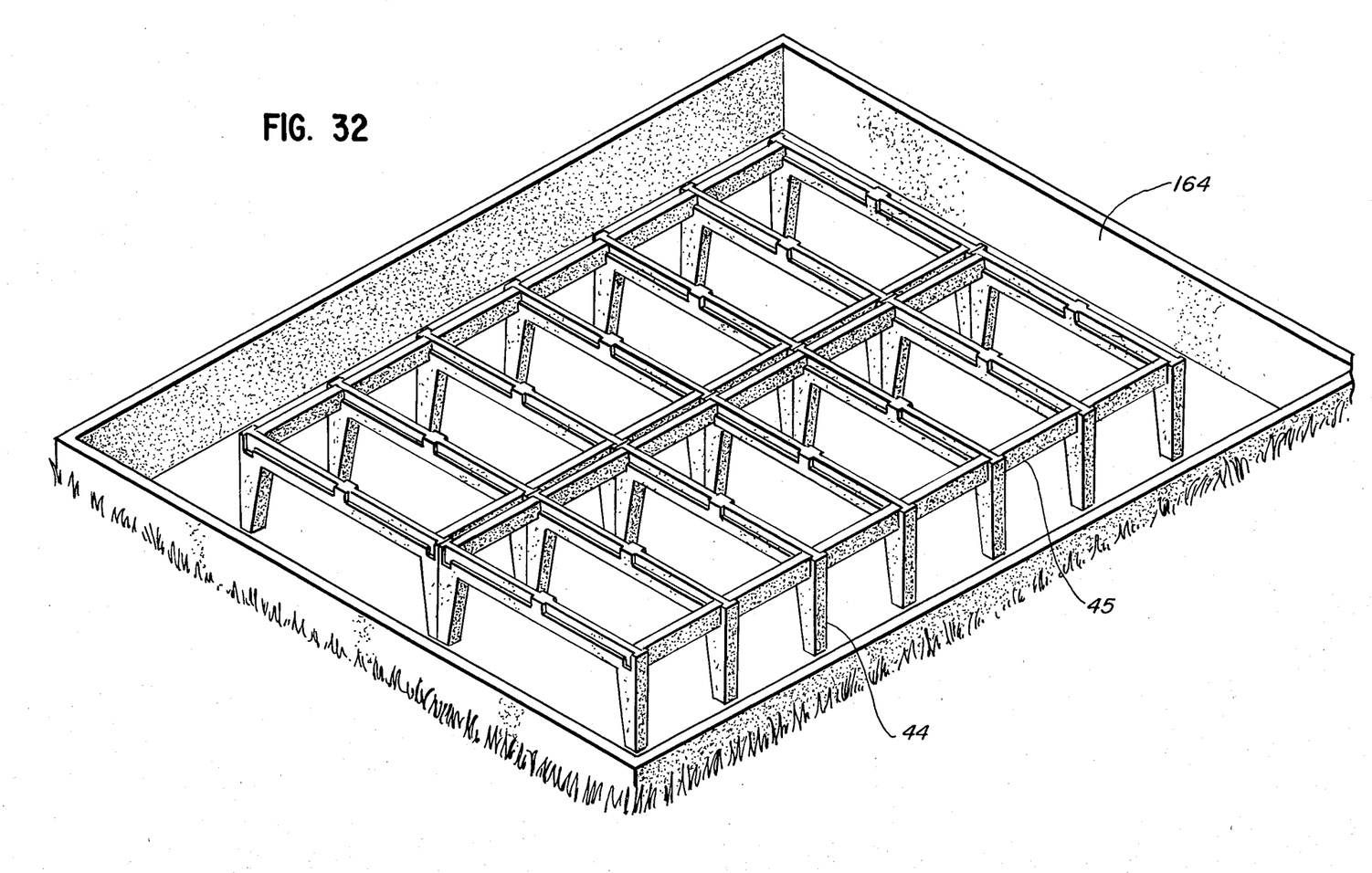
FIG. 32 is a perspective view of the concrete support structure for a four-cell cooling tower.

The cooling tower illustrated in FIG. 2 is a single-cell cooling tower which includes one fill section, one water distribution assembly, and one fan. The single cell includes four concrete legs 44. Additional cells can be added by increasing the number of concrete legs as illustrated in FIGS. 31 and 32. FIG. 31 illustrates the concrete support structure for a three-cell cooling tower which includes ten concrete support legs 44 and eighteen concrete connecting beams 45. The fourth concrete leg is the end leg for the first and second cells, and the seventh concrete leg is the end leg for the second and third cells. Suitable partitions can extend upwardly from the fourth and seventh legs to separate adjacent cells. The three-cell cooling tower is supported by an elongated rectangular concrete basin 163.

FIG. 32 illustrates the concrete support structure for a four-cell cooling tower. The supporting structure includes fourteen concrete legs 44 which are arranged in two parallel rows and twenty-four concrete connecting beams 45. Each row of legs supports two cells, and the middle leg of each row serves as the end leg for two adjacent cells. Suitable dividing partititions extend upwardly from the concrete support legs between adjacent cells. The cooling tower is supported within a concrete water basin 164.

It will be understood that the concrete support legs can be arranged in other patterns to support multiple cells, depending upon the capacity of cooling tower which is desired. In each cell the weight of the fill material is supported by the concrete legs, and the weight of the fan assembly is supported by the water supply pipe 59 and the pipe support beam 150. The side panels are not required to support structural load, and each side panel is required to support only its own weight, wind load, and seismic loads. Accordingly, the side panels need not have any special reinforcing as described in U.S. Pat No. 4,422,983.

In operation, hot water is pumped from the air conditioning system or other source of water which is to be cooled through the pipe 59 to the distribution box 63. Water flows from the distribution box 63 through the headers 64 and 65 and laterals 66 and is sprayed by the nozzle 67 onto the top of the fill material 58. As the water flows downwardly through the heat/mass exchange section provided by the fill material, air from outside of the cooling tower is drawn upwardly through the heat/mass exchange section by the fan 144. The air is drawn from outside of the cooling tower through the spaces between the foot portions 72 of the concrete legs. If desired, these spaces can be covered by louvers. Water which flows through the heat/mass exchange section is collected by the water basin 41 and is pumped back to the air conditioning system or other apparatus which requires cool water.

Figure 33:
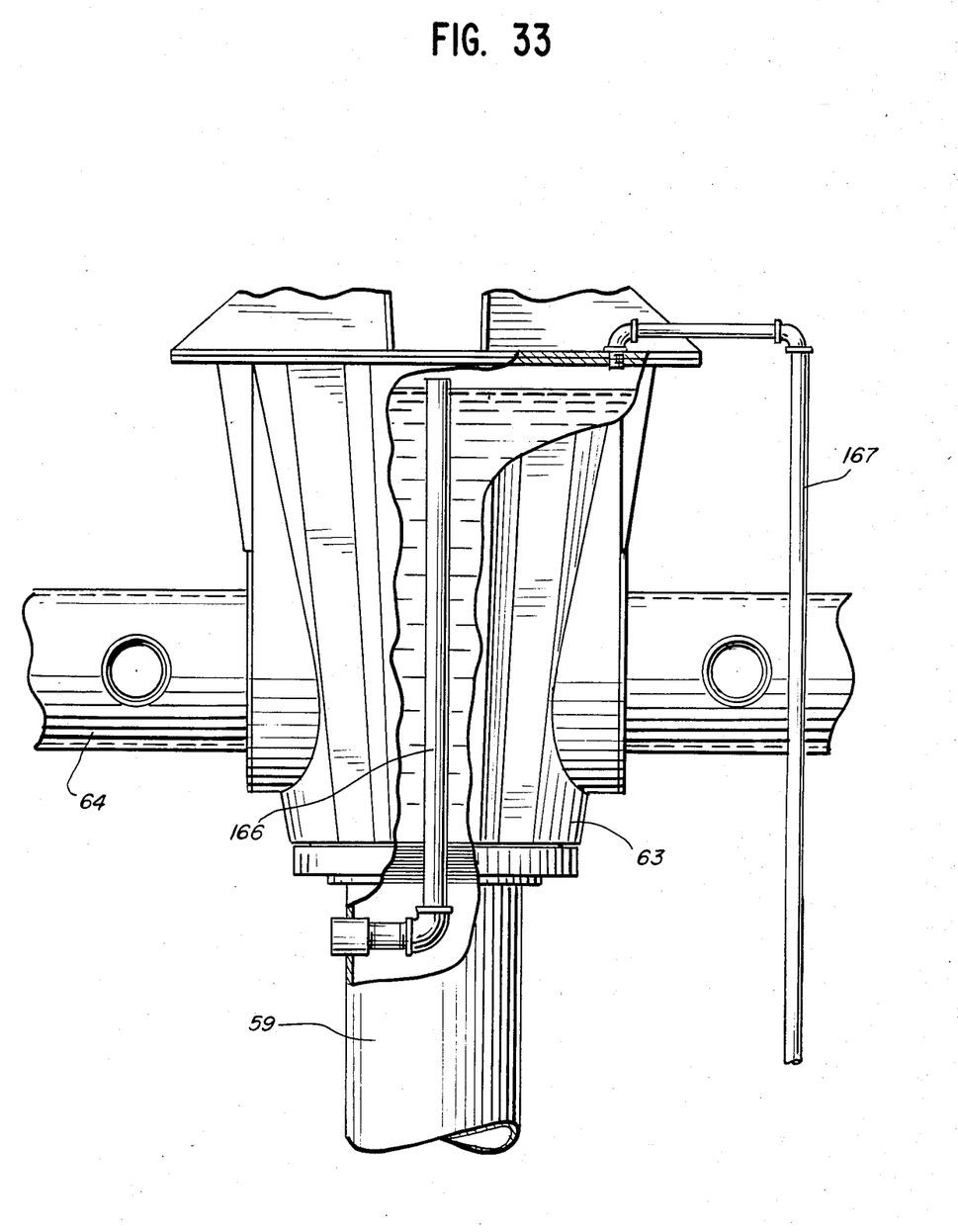
FIG. 33 is a fragmentary sectional view of the water distribution box equipped with an overflow pipe and a vent pipe.

FIG. 33 illustrates an overflow pipe 166 and a vent pipe 167 for the water distribution box 63. The overflow pipe 166 operates as a stand pipe for maintaining the head pressure of the water in the distribution box at a desired level. The upper end of the overflow pipe determines the maximum level of water and therefore the head pressure within the water distribution box, and if water flowed into the distribution box at a rate which would increase the head pressure above the desired level, the water will be vented by the overflow pipe through the bottom of the water distribution box and to the outside of the water supply pipe 59.

The flow rate which is pumped through the water supply pipe 59 can therefore be adjusted to the desired rate by increasing the flow rate until water begins to flow through the outlet of the overflow pipe and then reducing the flow rate slightly. This enables the desired flow rate to be set without looking into the distribution box.

As an alternative to the overflow pipe 166 within the water distribution box, the water distribution box could be provided with a port in the side wall thereof at the desired level.

The vent pipe 167 permits air within the water distribution box to be vented to the outside as the distribution box is filled with water.

While in the foregoing specification a detailed description of specific embodiments of the invention was set forth for the purpose of illustration, it will be understood that many of the details herein given may be varied considerably by those skilled in the art without departing from the spirit and scope of the invention.

I claim:
1. A liquid cooling tower comprising:
   (a) a plurality of concrete legs, each of the legs having a beam portion and pair of foot portions extending downwardly from the ends of the beam portion;
   (b) a pair of concrete cross members extending between each adjacent pair of legs and attached thereto;

(c) porous means for heat/mass exchange supported by the concrete legs and the concrete cross members;
(d) a liquid supply pipe extending vertically upwardly through the heat-mass exchange means;
(e) liquid distribution means about the heat/mass exchange means and connected to the liquid supply pipe for supplying liquid to the heat/mass exchange means;
(f) a fan above the liquid distribution means and supported by the liquid distribution means and the liquid supply pipe for drawing air through the heat/mass exchange means; and
(g) side panels formed from fiberglass reinforced polyester resin and supported by said legs and extending upwardly therefrom, the side panels being required to support substantially only their own weight, wind loads, and seismic loads.

2. The cooling tower of claim 1 including a plurality of vertical support columns attached to the concrete legs and extending upwardly therefrom adjacent the side panels, a top wall supported by the vertical columns and attached thereto, the top wall having a fan opening therein, the weight of the top wall being supported by the vertical columns and the concrete legs, the top wall and the vertical columns being formed from fiberglass reinforced polyester resin.

3. The cooling tower of claim 1 in which the beam portions of the concrete legs include ledges which provide horizontal support surfaces, and cast iron support lintels extending horizontally between adjacent pairs of concrete legs and supported by the ledges, the heat/mass exchange means being supported by the cast iron lintels.

4. The cooling tower of claim 1 including a concrete pipe support member extending between a pair of concrete legs and attached thereto, the liquid supply pipe being attached to the concrete pipe support member and being supported thereby.

5. The cooling tower of claim 4 in which the concrete pipe support member is provided with an opening having a vertical axis, the liquid supply pipe comprising a lower portion which is attached to the pipe support member about the opening therein and an upper portion which is attached to the pipe support member about the opening therein.

6. The cooling tower of claim 1 including a liquid distribution box attached to the upper end of the liquid supply pipe, the liquid distribution means being connected to the liquid distribution box.

7. The cooling tower of claim 6 including a beam formed of fiberglass reinforced polyester resin and connected to the top of the liquid distribution box and extending to one of the side walls of the cooling tower, a fan motor supported by the beam, the fan being connected to the beam about the liquid distribution box, and a vertical support column formed of fiberglass reinforced polyester resin and extending along said one side wall and attached to the end of said beam, the weight of the fan and the fan motor being supported by the liquid supply pipe and said vertical support column.

8. The cooling tower of claim 6 including port means within the liquid distribution box for permitting liquid within the liquid distribution box to drain when the liquid reaches a certain level whereby the liquid does not exceed said level.

9. The cooling tower of claim 8 in which the port means comprises a standpipe within the liquid distribution box having an upper end at said level and a lower end communicating with the exterior of the liquid distribution box.

* * * * *